March 14, 1944.  J. A. COXE  2,344,132

FISHING REEL SPOOL

Original Filed Nov. 4, 1936

Inventor
Joseph A. Coxe

By Freeman, Sweet,
Albrecht & Williams
Attorneys

Patented Mar. 14, 1944

2,344,132

UNITED STATES PATENT OFFICE 2,344,132

FISHING REEL SPOOL

Joseph A. Coxe, Los Angeles, Calif., assignor to Bronson Reel Company, Bronson, Mich., a corporation of Michigan Original application November 4, 1936, Serial No. 109,099, now Patent No. 2,251,782, dated August 5, 1941. Divided and this application March 11, 1940, Serial No. 323,253

7 Claims. (Cl. 242—125)

My invention relates to fishing reels and includes among its objects and advantages an increase in the amount of the forces an angler can exert in playing a large fish, together with various advantageous structural details ancillary thereto, particularly a spool construction capable of sustaining heavy loads.

Figure 1:
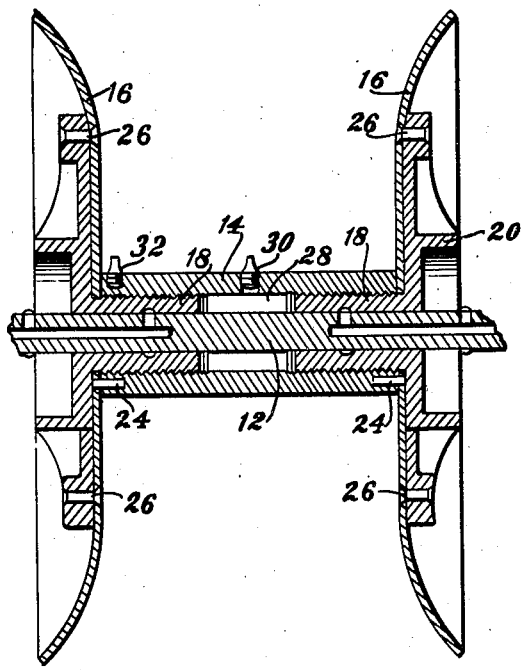
Figure 2:
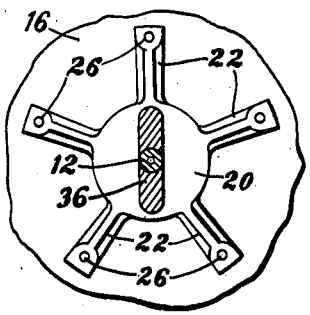

In the accompanying drawing:

Figure 1 is a diametrical section of a fishing reel spool according to the invention; and Figure 2 is a partial end view of the same spool.

In the embodiment of the invention selected for illustration, the spool comprises the central tubular shaft 14 with both ends internally threaded, end bells 16, and the reinforcing spiders best illustrated in Figure 2. Each such spider includes a cylindrical hub 18 threaded into the sleeve 14, an enlarged female clutch member 20, and five radial bracing arms 22, all formed as a single integral casting. Before the spiders are threaded home, each end bell is riveted to the sleeve 14 by means of three rivets 24. After the spiders are threaded home, the ends of the bracing arms 22 are riveted to the bells by rivets 26. The space at 28 between the hubs 18 provides an effective storage space for a packing of lubricant, such as heavy grease. The threaded plug 30 affords access to such space for filling purposes. A duplicate plug 32 is provided near one end of the sleeve 14, and both plugs 30 and 32 have their upper ends in the form of eyes for the attachment of the line. In case the angler prefers to attach his line in some other way, or only to use one of the attachment means provided, the plug 32 can be removed altogether, or either plug may be replaced by one without the projecting eye.

The hubs 18 have long bearing engagement with the cross bolt 12. Each female clutch member 20 has a central slot extending across most of its face and receiving the key 36 of a driving element.

Any suitable frame and driving mechanism may be associated with such a spool such, for instance, as set forth in my copending application, Serial Number 109,099, filed November 4, 1936, now Patent 2,251,782, issued August 5, 1941, of which this application is a division.

The spool assembly is symmetrical about its middle transverse plane so that it can be reversed end for end by separating the parts of the reel and reassembling them.

Without further elaboration the foregoing will so fully explain my invention that others may, by applying knowledge current at the time of application, readily adapt the same for use under various conditions of service.

I claim:

1. A spool for fishing reels comprising: an internally threaded sleeve; end bells riveted to the ends of said sleeve; bracing spiders each including a central hub threaded inside said sleeve and having a smooth internal bore adapted to form a long bearing on a supporting shaft, an enlarged plane portion abutting the outer surface of the adjacent end bell, arms radiating from said plane portion to reinforce said end bell, and a female clutch member co-axial with said plane portion and integral therewith; and rivets fastening the ends of said arms to said end bell.

2. A spool for fishing reels comprising: a sleeve; end bells riveted to the ends of said sleeve; and bracing spiders each including a central hub entered inside said sleeve, and radiating arms to reinforce said end bell; and rivets fastening the ends of said arms to said end bell.

3. A spool for fishing reels comprising, in combination: a tubular sleeve; end bells having portions abutting the ends of said sleeve; dowel pins passing through said abutting end bell portions and penetrating said sleeve; a reinforcing spider lying adjacent each end bell; each spider having a hub covering said dowel pins and a threaded nipple extending from said hub axially inside said sleeve in threaded engagement therewith; each spider having a plurality of radial arms; the ends of said arms being fixedly attached to the adjacent end bell.

4. A spool for fishing reels, comprising, in combination: a tubular metallic sleeve; end bells having portions abutting the ends of said sleeves; a metallic reinforcing member abutting each end bell on the side remote from said sleeve; rivet means entered in said sleeve and an adjacent end bell but not in said reinforcing member; additional rivet means penetrating said reinforcing member and an adjacent end bell but not said sleeve; said first mentioned rivet means being covered by said reinforcing members; said second mentioned rivet means being radially spaced from the axis of the spool at a distance greater than the radius of said sleeve; each reinforcing member having an integral threaded nipple passing centrally through the adjacent end bell and having threaded engagement with the inner surface of said sleeve.

5. A spool for fishing reels, comprising, in combination: a tubular metallic sleeve; metallic end bells having portions abutting the ends of said sleeves; a metallic reinforcing member abutting each end bell on the side remote from said sleeve; rivet means entered in said sleeve and an adjacent end bell but not in said reinforcing member; and additional rivet means penetrating said reinforcing member and an adjacent end bell but not said sleeve; each reinforcing member having an integral threaded nipple passing centrally through the adjacent end bell and having threaded engagement with the inner surface of said sleeve.

6. A spool for fishing reels, comprising, in combination: a tubular metallic sleeve; metallic end bells having portions abutting the ends of said sleeves; a metallic reinforcing member abutting each end bell on the side remote from said sleeve; rivet means entered in said sleeve and an adjacent end bell but not in said reinforcing member; additional rivet means penetrating said reinforcing member and an adjacent end bell but not said sleeve; said first mentioned rivet means being covered by said reinforcing member; each reinforcing member having an integral threaded nipple passing through the adjacent end bell and having threaded engagement with the inner surface of said sleeve.

7. A spool for fishing reels comprising, in combination: a tubular metallic sleeve; bearing means adjacent each end of the sleeve and defining a bearing of smaller diameter than the interior diameter of the sleeve, whereby said sleeve, when mounted on a shaft fitting said bearings, will, with said shaft, define an annular lubricant storage space between said bearings; a radial opening in said sleeve adapted to communicate with said storage space; and a removable line attachment device insertible in said opening, and when so inserted closing said opening against egress of lubricant.

JOSEPH A. COXE.